(12) United States Patent
Davies

(10) Patent No.: US 9,939,026 B2
(45) Date of Patent: Apr. 10, 2018

(54) UNIVERSAL JOINTS

(71) Applicant: Goodrich Actuation Systems Limited, West Midlands (GB)

(72) Inventor: Stephen Davies, Shrewsbury (GB)

(73) Assignee: GOODRICH ACTUATION SYSTEMS LIMITED, Shirley, Solihull, West Midlands (GB)

(*) Notice: Subject to any disclaimer, the term of this patent is extended or adjusted under 35 U.S.C. 154(b) by 0 days.

(21) Appl. No.: 15/466,138

(22) Filed: Mar. 22, 2017

(65) Prior Publication Data

US 2017/0276186 A1 Sep. 28, 2017

(30) Foreign Application Priority Data

Mar. 24, 2016 (GB) .................................. 16162281.6

(51) Int. Cl.
*F16D 3/38* (2006.01)

(52) U.S. Cl.
CPC .................... *F16D 3/387* (2013.01)

(58) Field of Classification Search
CPC ... F16D 3/30; F16D 3/38; F16D 3/382; F16D 3/385; F16D 3/387; F16D 3/42; Y10T 464/905
USPC .............. 464/96, 98, 99, 125, 134, 135, 905
See application file for complete search history.

(56) References Cited

U.S. PATENT DOCUMENTS

| | | | |
|---|---|---|---|
| 1,371,006 A | 3/1921 | Thiemer | |
| 1,450,707 A * | 4/1923 | Anderson | F16D 3/42 464/12 |
| 1,450,719 A | 4/1923 | Faust | |
| 2,336,579 A * | 12/1943 | Venditty | F16D 3/28 464/128 |
| 2,947,157 A | 8/1960 | Harris | |
| 5,558,182 A | 9/1996 | De La Fuente et al. | |
| 2004/0192447 A1 | 9/2004 | Fisher et al. | |

FOREIGN PATENT DOCUMENTS

| | | | |
|---|---|---|---|
| DE | 578107 C | 6/1933 | |
| EP | 2803584 A1 * | 11/2014 | ............... B64C 9/16 |
| GB | 972890 A | 10/1964 | |
| GB | 2158191 A | 11/1985 | |
| GB | 2215434 A | 9/1989 | |
| JP | S54118954 U | 8/1979 | |
| JP | S5686230 A | 7/1981 | |

OTHER PUBLICATIONS

Extended European Search Report for International Application No. 16162281.6 dated Nov. 9, 2016, 8 pages.

* cited by examiner

*Primary Examiner* — Josh Skroupa
(74) *Attorney, Agent, or Firm* — Cantor Colburn LLP

(57) ABSTRACT

A universal joint comprises an input shaft comprising at one end thereof a first pair of arms and an output shaft comprising at one end thereof a second pair of arms. Respective opposed first pivot pins are provided on the distal ends of the first pair of arms and aligned along a first axis ($P_1$). Respective opposed second pivot pins are provided on the distal ends of the second pair of opposed arms and aligned along a second axis ($P_2$), the second axis ($P_2$) being perpendicular to the first axis ($P_1$). The joint further comprises a compliant ring extending around the input and output shafts and having first and second pairs of opposed openings for receiving the first and second pivot pins.

14 Claims, 6 Drawing Sheets

Section C-C

View on A-A

View on B-B

UNIVERSAL JOINTS

FOREIGN PRIORITY

This application claims priority to European Patent Application No. 16162281.6 filed Mar. 24, 2016, the entire contents of which is incorporated herein by reference.

TECHNICAL FIELD

The present disclosure relates to universal joints.

BACKGROUND

Universal joints are used in a wide range of applications to transmit rotary motion between an input and output shafts which may not be coaxial.

One such application is in aircraft to transmit power from a centralised power drive unit to a plurality of actuators that are located along leading and trailing edges of wings. Depending upon the location of the power transmission line with respect to the wing neutral axis, the transmission line can see length changes as a function of wing bending in flight manoeuvres and in high load phases of normal take-off and landing cycles. This, together with the torque loads which the joints are intended to accommodate, can develop axial loads within the transmission system that must be reacted by suitable aircraft structure. These loads are a function of the spline size that connects the universal joints with associated actuators or shafts, and can develop in the order of 9 kN of axial load. Substantial aircraft structure must be provided to counter such forces. It would therefore be desirable to reduce the axial forces experienced in a transmission line and reduce the forces acting upon actuators, joints and supporting structure.

SUMMARY

Disclosed herein is a universal joint which comprises an input shaft and an output shaft. The input shaft comprises at one end thereof a first pair of arms. The output shaft comprises at one end thereof a second pair of arms. Respective opposed first pivot pins are provided on the distal ends of the first pair of arms and aligned along a first axis. Respective opposed second pivot pins are provided on the distal ends of the second pair of arms and aligned along a second axis which is perpendicular to the first axis. The joint further comprises an axially compliant ring which extends around the input and output shafts and which has first and second pairs of opposed openings for receiving the first and second pivot pins.

In one embodiment, the first and second pivot pins may project from the first and second arms and be received in the respective ring openings.

Respective bushings may be received within the respective openings and the pivot pins be received within the bushings.

In another embodiment, the respective first and second arms are formed with clevises and the respective pivot pins are received in the clevises and extend through the openings in the ring.

The clevises may be provided with bushings which receive the pivot pins.

In various embodiments, the ring may be formed with enlarged bosses through which the pivot pin receiving openings are formed, and webs extending between the bosses.

The webs may have a ratio of radial depth to axial width of 1:1 to 20:1.

The webs may have a rectangular, square or trapezoidal cross section.

The ring may have, in the axial direction, a stiffness of less than or equal to 4 kN/mm, greater than or equal to 1.0 kN/mm or between 1 kN/mm and 4 kN/mm.

The ring may be made from a fibre reinforced composite material. Alternatively, the ring may be made from a metallic material.

The ring may comprise a plurality of ring elements laminated together face to face.

The ring may be made by an additive manufacturing process.

The disclosure also extends to a drive transmission system comprising a universal joint as discussed above.

The disclosure also extends to an aircraft actuator system comprising a power drive unit and a plurality of actuators driven by the power drive unit through a drive transmission system as above.

BRIEF DESCRIPTION OF DRAWINGS

Some embodiments of the disclosure will now be described, by way of example only, with reference to the accompanying drawings in which.

DETAILED DESCRIPTION

Figure 1:
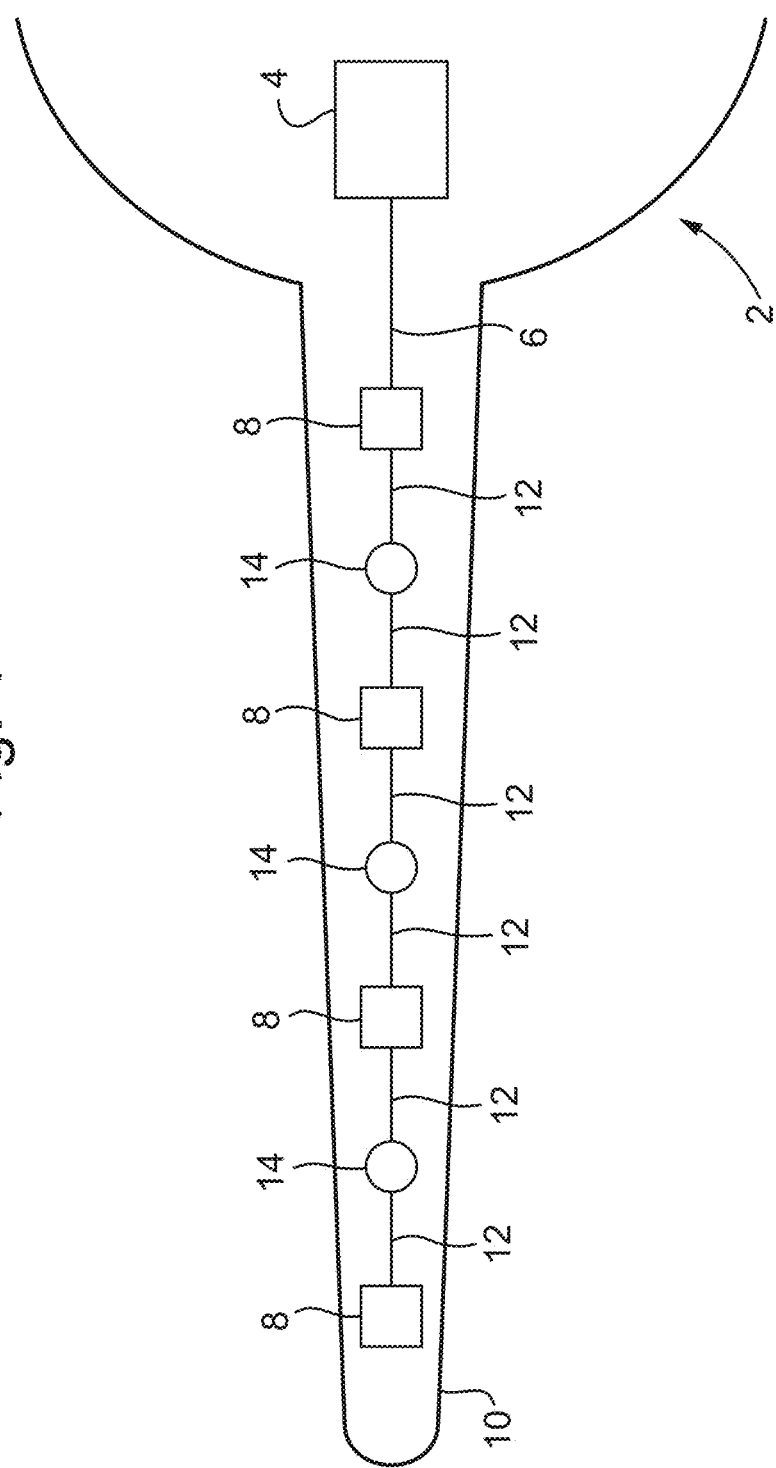
FIG. 1 shows, schematically, a power transmission system in an aircraft.

With reference to FIG. 1, an aircraft 2 comprises a central power drive unit 4 (shown schematically) having a rotary power output shaft 6. The power output shaft 6 is connected to a series of actuators 8 arranged along the aircraft wing 10. The actuators 8 may be used to move wing control surfaces such as flaps, slats, spoilers and so on. Power is transmitted between the actuators 8 by shafts 12. The shafts 12 are coupled by universal joints 14 which will accommodate angular misalignments between the shafts 12.

As discussed above, deflection of the aircraft wing 10 will result in changes in length and loads within the power transmission line, which loads will have to be reacted by structure in the wing 10, adding to the weight of the wing 10, which is undesirable.

To mitigate this problem, this disclosure proposes in various embodiments, a universal joint which will be able to accommodate such movements, thereby limiting the magnitude of loads transferred to the aircraft structure allowing appropriate down-sizing and weight reduction.

Figure 2:
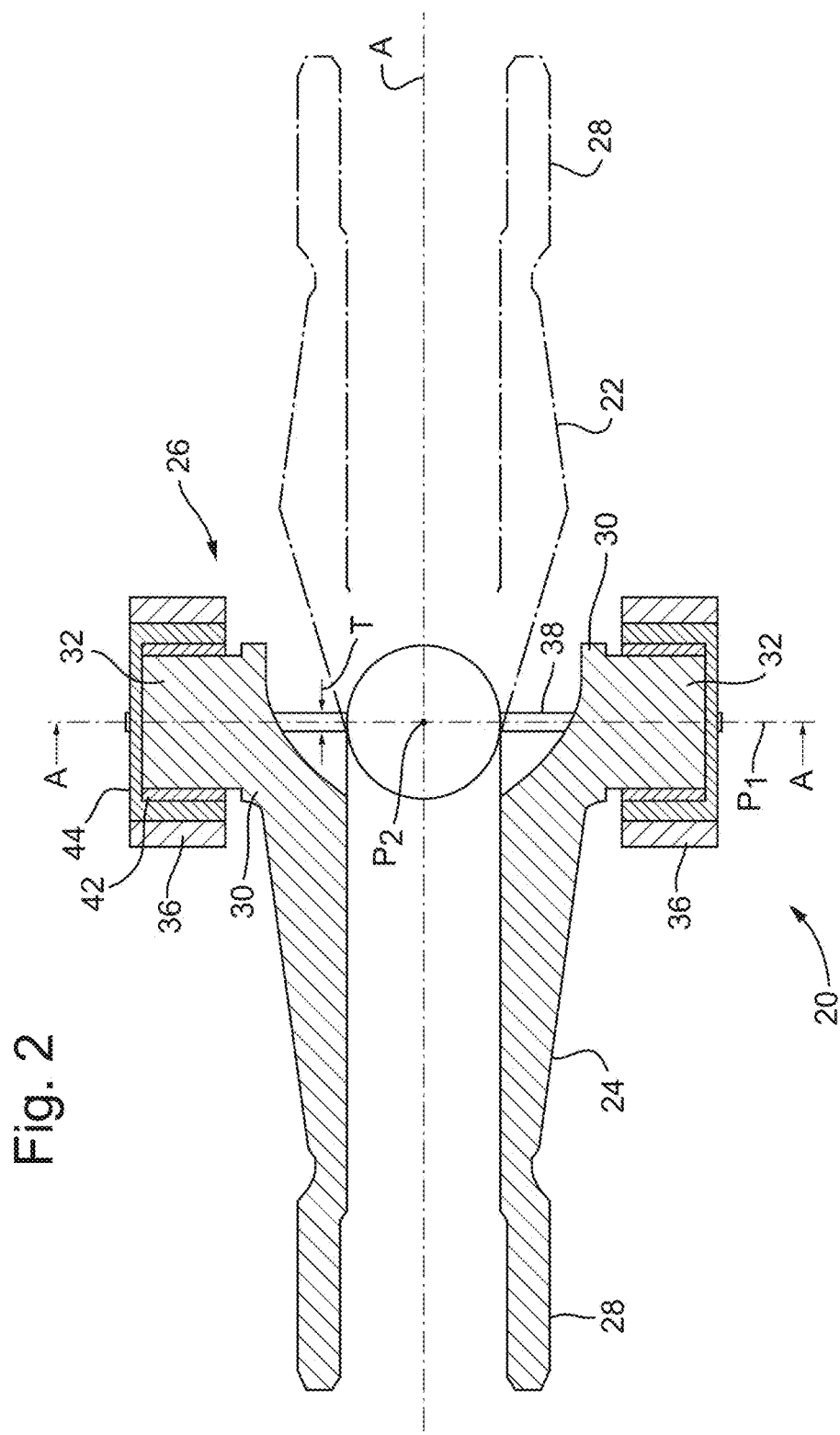
FIG. 2 shows, schematically, a universal joint in accordance with this disclosure for use in the system of FIG. 1.

FIGS. 1 and 2 illustrate a first embodiment of universal joint 20 in accordance with the disclosure.

The universal joint 20 comprises an input shaft 22, an output shaft 24 and a ring 26 surrounding overlapping ends of the input and output shafts 22, 24.

Figure 3:
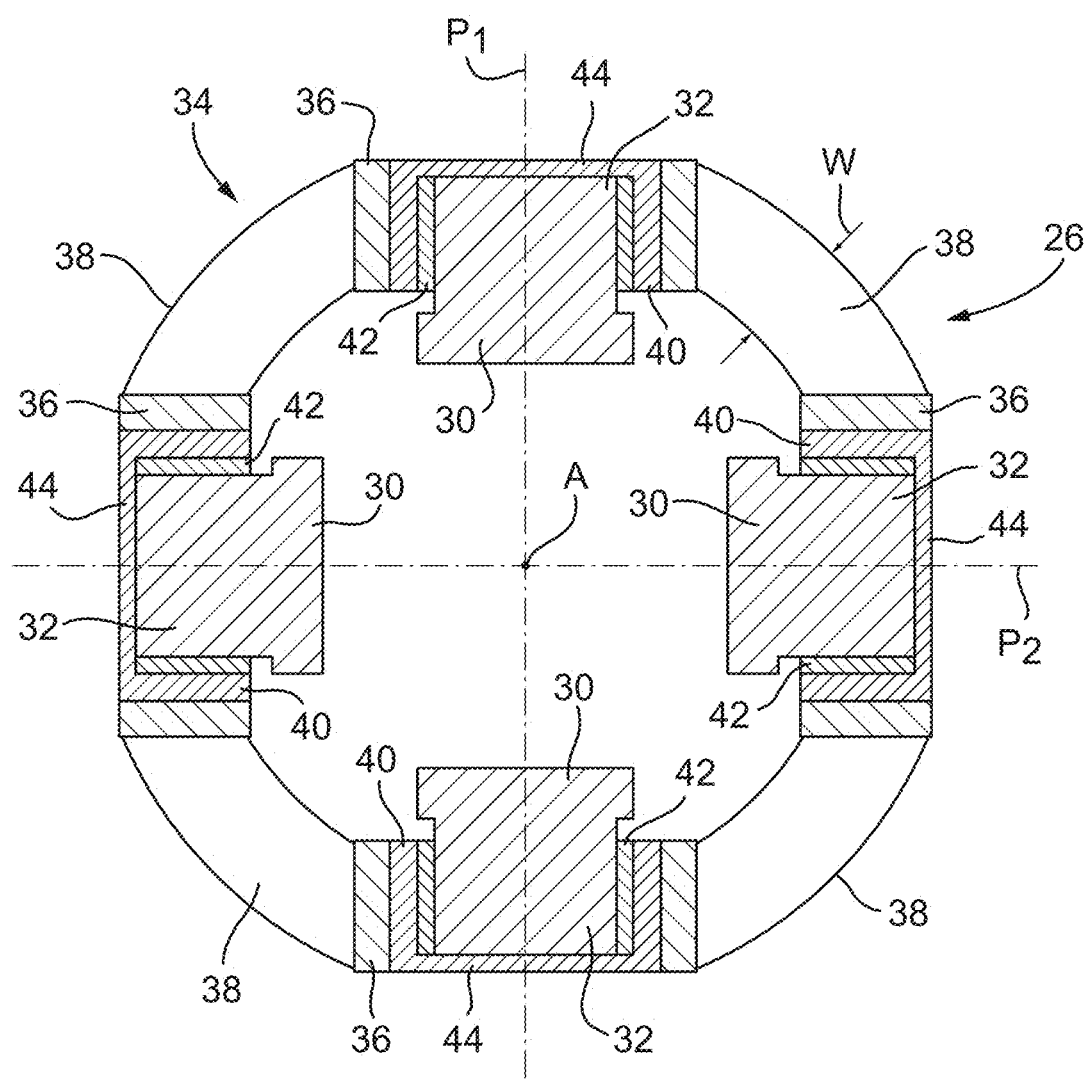
FIG. 3 shows a cross section along line A-A of FIG. 2.
Figure 4:
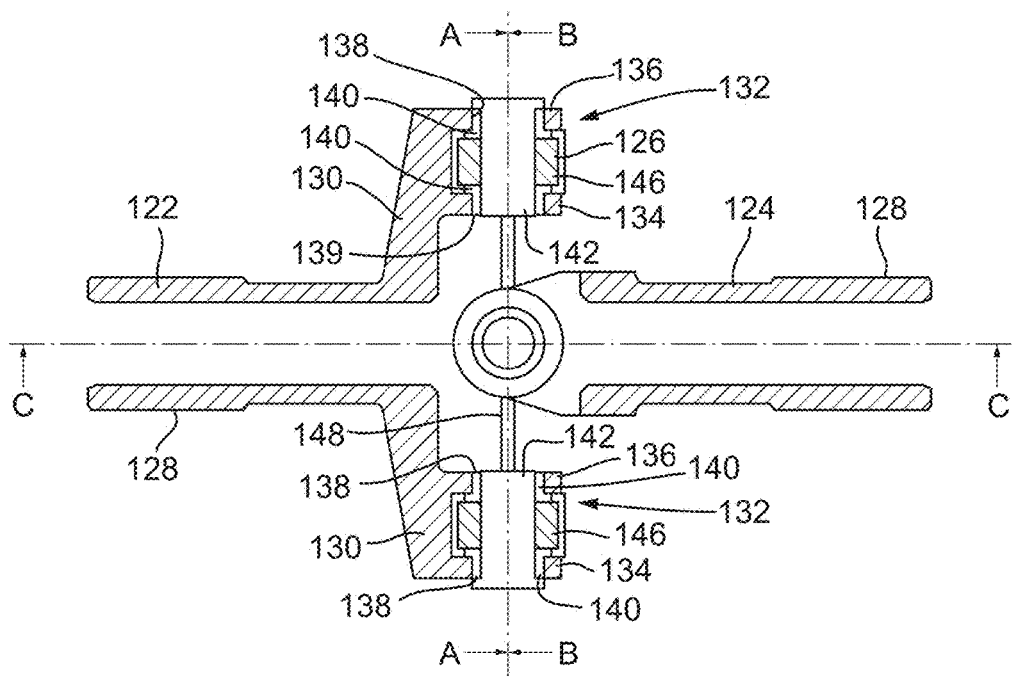
FIG. 4 shows a vertical cross section taken through a second universal joint in accordance with the disclosure.
Figure 5:
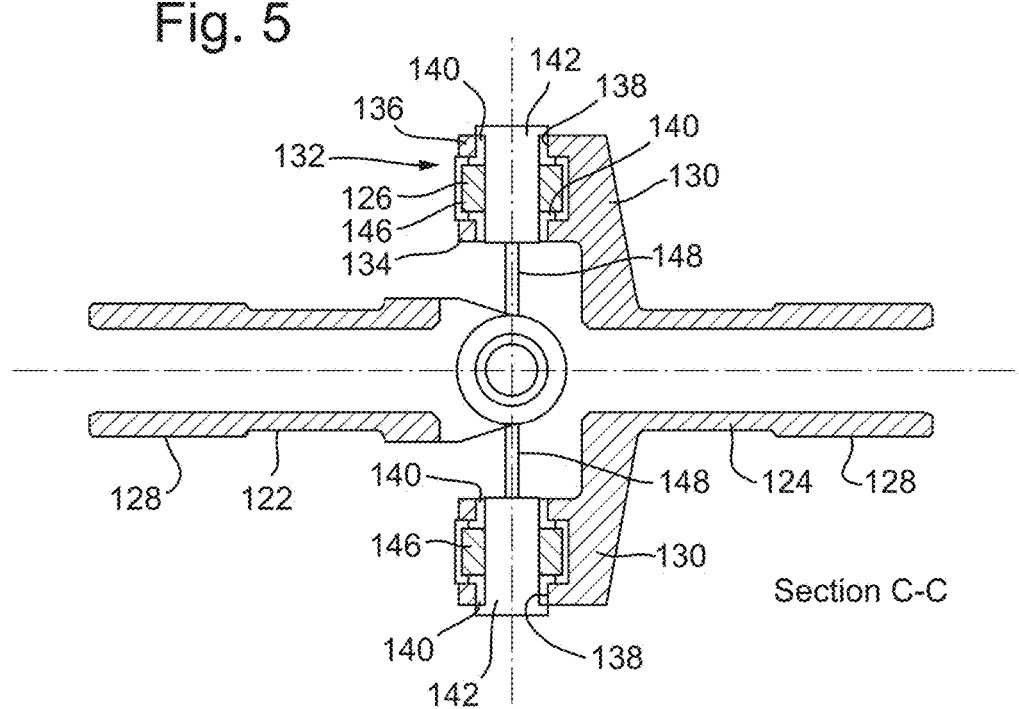
FIG. 5 shows a horizontal sectional cross section taken through the universal joint of FIG. 4.

The input shaft 22 and output shaft 24 are substantially the same in construction in this embodiment. Each shaft 22, 24 comprises a splined coupling 28 at one end for coupling to an adjacent shaft or actuator, for example. Of course other form of couplings may be used if appropriate. The other end of each shaft 22, 24 comprises a pair of outwardly extending opposed arms 30. Each arm 30 is formed with an outwardly extending hinge pin 32. The pins 32 of the output shaft 24 are aligned along a pivot axis $P_1$ and the pins 32 of the input shaft 22 are aligned along pivot axis $P_2$ which is arranged at right angles to the axis $P_1$ as shown in FIG. 3. The axes $P_1$ and $P_2$ may intersect, for example in a no-load condition of the joint.

The hinge pins 32 are received within the ring 26. The ring 26 comprises a generally annular body 34 which comprises a plurality of bosses 36 connected by webs 38, in this case arcuate webs 38. In this embodiment, the webs 38 are rectangular in cross section. The bosses 36 each comprise an opening 40 for receiving a respective hinge pin 32. The openings 40 are lined with a bushing 42 and a cap 44 supporting the bushing 42.

The arrangement of the pins 32 and openings 40 allows the input and output shafts 22, 24 to pivot about the orthogonal axes $P_1$ and $P_2$, in the manner of a traditional universal joint.

The webs 38 are relatively thin and therefore relatively flexible. For example, in some embodiments, the ratio between the axial web thickness T and radial web width W may be between 1:1 and 1:20. By axial as used herein is meant in a direction along or parallel to the axis of the central axis A of the ring 26, and by radial is meant in a direction generally radially extending from the central axis A of the ring 26. Each web 38 may be flat, i.e. lie in a plane, or be contoured, for example having a wave-like profile.

The ring 26 may be made from any appropriate material, such as a fibre reinforced plastics material, or a metal such as titanium and may be made by any suitable process, for example an additive manufacturing process, The universal joint 20 is able better to accommodate axial forces and deflections than prior art universal joints while at the same time providing sufficient torsional stiffness for rotary load transmission. The ring 26 is, by virtue of its relatively flexible webs 38, able to deflect under axial loads, thereby reducing forces in other parts of the system. Typically the axial stiffness of the joint 20 may be less than 1.0 N/mm. However, the axial stiffness may be less than 4.0 kN/mm, for example in the range of 1.0 kN/mm to 4.0 kN/mm.

The axial stiffness of the ring 26 will be determined to a significant extent by the length of the relatively thin webs 38. A second embodiment of the disclosure which facilitates the provision of longer and thus potentially more flexible webs will now be described with reference to FIGS. 4 to 7.

The universal joint 120 of the second embodiment comprises an input shaft 122, an output shaft 124 and a ring 126 surrounding overlapping ends of the input and output shafts 122, 124.

The input shaft 122 and output shaft 124 are substantially the same in construction in this embodiment. Each shaft 122, 124 comprises a splined coupling 128 at one end for coupling to an adjacent shaft or actuator, for example. Of course other form of couplings may be used if appropriate. The other end of each shaft 122, 124 comprises a pair of outwardly extending opposed arms 130. In this embodiment, however, each arm 130 is formed with a clevis 132 having inner and outer limbs 134, 136. Aligned openings 138 are formed through the clevis limbs 134, 136.

Figure 6:
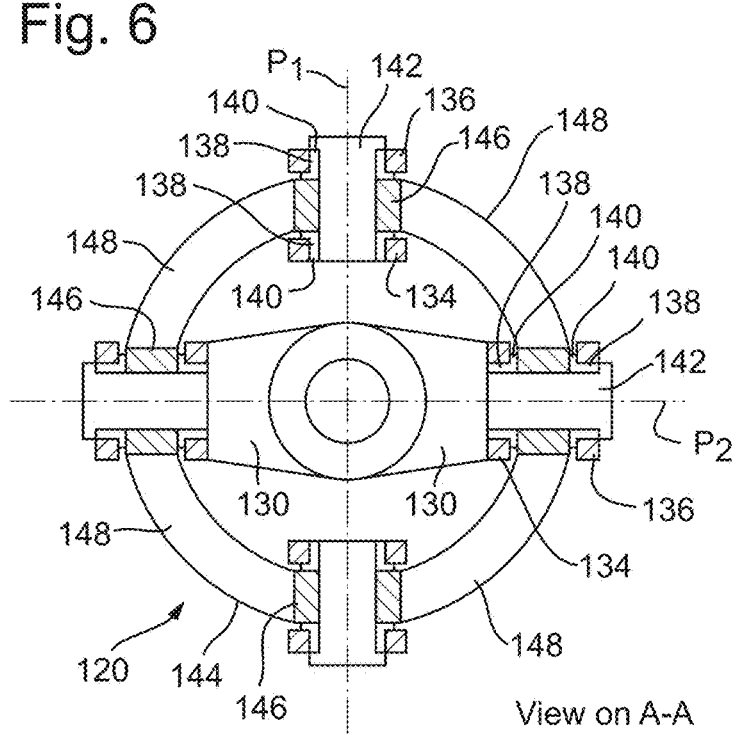
FIG. 6 shows a view on A-A of FIG. 4.
Figure 7:
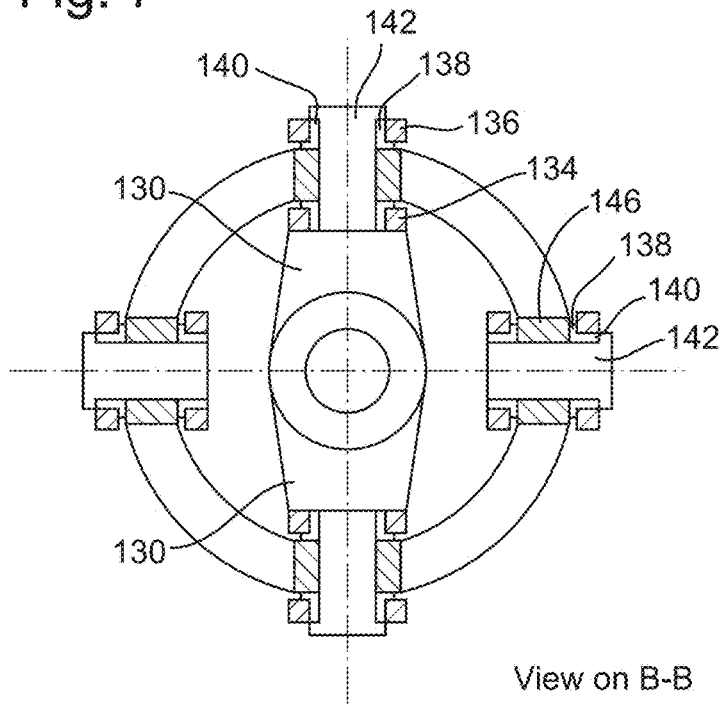
FIG. 7 shows a view on B-B of FIG. 4.

The openings 138 are lined with respective bushings 140 which receive a respective hinge pin 142 which is received within the clevis opening 138. Each hinge pin 142 is retained within the clevis opening 138 by suitable means. The hinge pins 142 of the output shaft 124 are aligned along a pivot axis $P_1$ and the pins 142 of the input shaft 122 are aligned along pivot axis $P_2$ which is arranged at right angles to and, in for example a no-load condition, intersects the axis $P_1$ as shown in FIG. 6.

The ring 126 comprises a generally annular body 144 which comprises a plurality of bosses 146 connected by webs 148, in this case arcuate webs 148. As in the earlier embodiment, the webs 148 are rectangular in cross section. The bosses 146 each comprise an opening 150 for receiving a respective hinge pin 142.

As in the earlier embodiment, the arrangement allows the input and output shafts 122, 124 to pivot about the orthogonal axes $P_1$ and $P_2$, in the manner of a traditional universal joint.

The axial stiffness provided by the second embodiment may be as for the first embodiment. However, the second embodiment may allow improved flexibility or reduced stresses in the ring 126. Specifically, the use of a clevis 132 and pin 142 allows the pin 142 to be of a smaller diameter than the pin 32 in the earlier embodiment. This in turn allows the ring 126 to have smaller bosses 146, meaning that the webs 148 of material between the bosses 146 may be longer than in the earlier embodiment, resulting in improved flexibility. This is apparent from a comparison of FIGS. 3 and 6 for example.

Thus in both embodiments, the ring 26, 126 acts as a torque ring, transmitting torque between the input and output shafts but also acts to accommodate some axial movement of the input and output shafts relative to each other.

The axial stiffness of the joints 20, 120 may be greater than 1.0 N/mm. However, the axial stiffness may be less than 4.0 kN/mm, for example in the range of 1.0 kN/mm to 4.0 kN/mm. Thus the ring may deflect axially for example 1 mm when subject to an axial load of 41A.

As discussed above, the torque ring 26, 126 may be made in a number of ways. For example, the ring 26, 126 may be made from a composite material, for example a fibre reinforced plastics material. The layup of the reinforcement may be such as to provide the necessary torsional stiffness and at the same time the desired axial stiffness. In an alternative embodiment the ring may be made from a metallic material, for example titanium.

Figure 8:
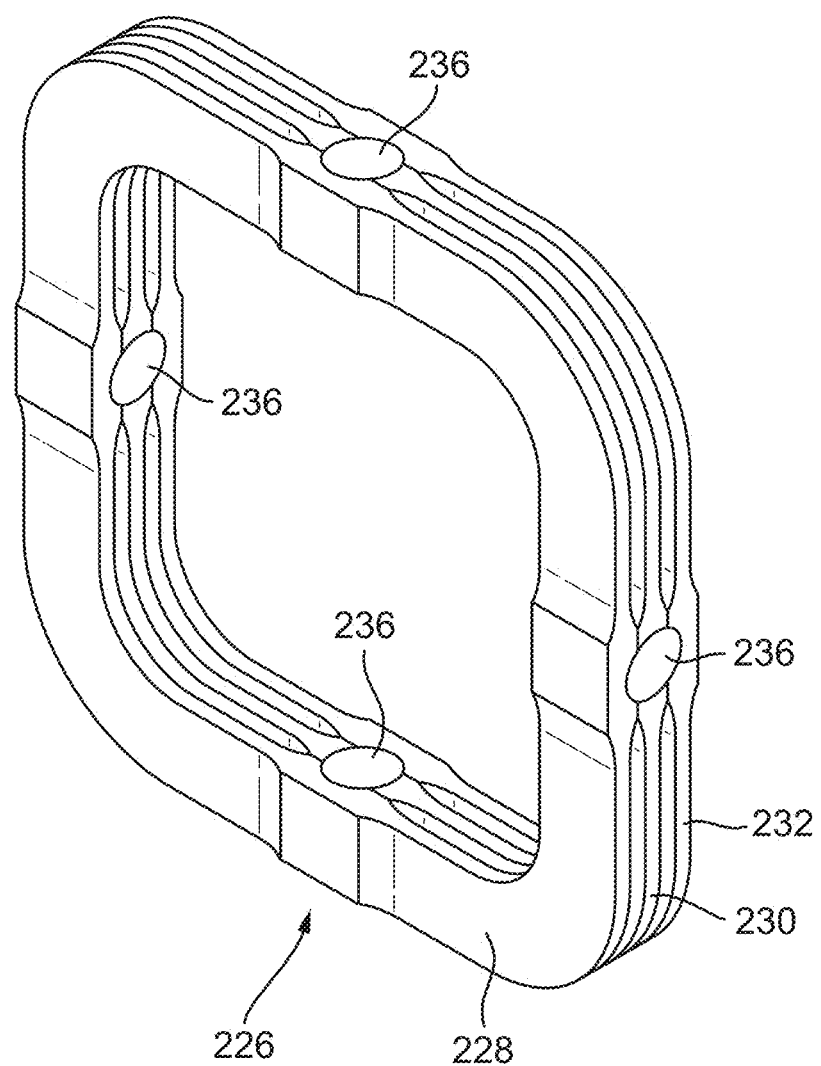
FIG. 8 shows a laminated ring in accordance with the disclosure.

The ring 26, 126 may be a unitary construction or an assembly. In one embodiment the ring may comprise a stack of ring elements suitably joined. Such an embodiment is disclosed in FIG. 8.

In this embodiment, a ring 226 comprises three ring elements 228, 230, 232 suitably joined together. Of course the ring 226 could comprise more or fewer ring elements. The ring elements may be formed of a low modulus metallic material such as Titanium. Each ring element 228, 230, 232 comprises a boss portion 234 and a web portion 236. The ring elements are joined, for example bonded, at the boss portions 234, and openings 236 formed through the boss portions 234 to receive the hinge pins. The openings 236 can be part formed in the ring elements 228, 230, 232 and finish machined. The construction method may allow for a universal joint of a given torsional stiffness and strength whilst providing a very low axial stiffness as a result of the ring element depth/width proportions.

In an alternative arrangement, the ring 226 could be made from an additive manufacturing process, avoiding the need for the separate fabrication and assembly of multiple elements.

From the above, it will be seen that the disclosure provides a universal joint which has a degree of axial compliance which absorbs axial forces acting on the joint. Thus results in lower loads to be reacted at aircraft structural mountings, allowing a reduction in aircraft structure weight. The resilience of the ring also allows the joint to return to its original condition once the loads have been removed.

The geometry of the ring 26, 126 and the material chosen for it contribute to the desired stiffness, and the skilled person will be able to tailor the geometry and material to achieve the desired stiffness. For example, while generally rectangular section webs 38, 148 are disclosed, other cross sectional shapes may be used. Also, while the rings 26, 126 are shown as generally circular in shape, other shapes, for example more square shapes may be used.

It will also be appreciated that other modifications may be made to the embodiments disclosed without departing from the scope of the disclosure.

The invention claimed is:

1. A universal joint comprising:
an input shaft comprising at one end thereof a first pair of arms;
an output shaft comprising at one end thereof a second pair of arms;
respective opposed first pivot pins provided on distal ends of the first pair of arms and aligned along a first axis ($P_1$);
respective opposed second pivot pins provided on distal ends of the second pair of arms and aligned along a second axis ($P_2$), the second axis ($P_2$) being perpendicular to the first axis ($P_1$); and
an axially compliant ring extending around the input and output shafts and having first and second pairs of opposed openings for receiving the first and second pivot pins;
wherein the respective first and second arms are formed with clevises and the respective pivot pins are received in the clevises and extend through the openings in the ring.

2. A universal joint as claimed in claim 1, wherein the clevises are provided with bushings which receive the pivot pins.

3. A universal joint as claimed in claim 1, wherein the axially compliant ring is formed with enlarged bosses through which the pivot pin receiving openings are formed and webs extending between the bosses.

4. A universal joint as claimed in claim 3, wherein the webs have a ratio of axial thickness to radial depth of between 1:1 and 1:20.

5. A universal joint as claimed in claim 3, wherein the webs have a rectangular cross section.

6. A universal joint as claimed in claim 1, wherein the axially compliant ring has, in the axial direction, a stiffness of less than or equal to 4.0 kN/mm.

7. A universal joint as claimed in claim 1, wherein the axially compliant ring is made from a fibre reinforced composite material.

8. A universal joint as claimed in claim 1, wherein the axially compliant ring is made from a metallic material.

9. A universal joint as claimed in claim 1, wherein the axially compliant ring comprises a plurality of ring elements laminated face to face.

10. A universal joint as claimed in claim 1, wherein the axially compliant ring is made by an additive manufacturing process.

11. A drive transmission system comprising a universal joint as claimed in claim 1.

12. An aircraft actuator system comprising a power drive unit and a plurality of actuators driven by said power drive unit through a drive transmission system as claimed in claim 11.

13. A universal joint as claimed in claim 1, wherein the axially compliant ring has, in the axial direction, a stiffness of of between 4.0 kN/mm and 1.0 kN/mm.

14. A universal joint as claimed in claim 1, wherein the axially compliant ring has, in the axial direction, a stiffness of greater than or equal to 1.0 kN/mm.

* * * * *